United States Patent [19]

Elrick

[11] 4,052,943
[45] Oct. 11, 1977

[54] COATING COMPOSITION AND METHOD FOR IMPROVING PROPELLANT TEAR STRENGTH

[75] Inventor: Donald E. Elrick, Rawlings, Md.

[73] Assignee: The United States of America as represented by the Secretary of the Navy, Washington, D.C.

[21] Appl. No.: 723,696

[22] Filed: Sept. 16, 1976

[51] Int. Cl.$^2$ ............................................. F42B 5/16
[52] U.S. Cl. ................................. 102/103; 264/3 E; 149/19.4; 149/19.5
[58] Field of Search ............... 102/103; 149/19.4, 19.5; 60/253; 264/3 E

[56] References Cited

U.S. PATENT DOCUMENTS

| | | | |
|---|---|---|---|
| 3,215,028 | 11/1965 | Pitchford et al. | 102/103 X |
| 3,445,306 | 5/1969 | Satriana | 149/19.4 X |
| 3,447,980 | 6/1969 | Voigt, Jr. | 149/19.4 |
| 3,558,285 | 1/1971 | Ciccone et al. | 102/103 X |
| 3,713,395 | 1/1973 | Carpenter et al. | 102/103 |
| 3,960,088 | 1/1976 | Greever | 102/103 |
| 3,961,476 | 6/1976 | Wasserman et al. | 102/103 X |

Primary Examiner—Peter A. Nelson
Attorney, Agent, or Firm—Richard S. Sciascia; Paul N. Critchlow

[57] ABSTRACT

A typical rocket motor includes a motor casing containing a cast propellant bonded to the casing and provided with a port through which combustion gases are delivered to the motor nozzle. During storage and operation, mechanical stresses in the propellant may produce tears resulting in motor malfunctions. Tear strength can be increased by reactively forming on selected port surface areas a thin-film cross-linked polymeric gel coating formed essentially of a highly functional polyglycol adipate and a polyfunctional isocyanate. Cross-linking with the propellant can be achieved by controlling the hydroxyl to isocyanate ratios of the coating and the propellant. The coating is particularly useful on XLDB (cross-linked, composite-modified double base) and on CMDB (composite-modified double-base) propellants.

11 Claims, 2 Drawing Figures ized in the United States on Apr. 4, 1977 under Ser. No. 784,297.

COATING COMPOSITION AND METHOD FOR IMPROVING PROPELLANT TEAR STRENGTH

BACKGROUND OF THE INVENTION

The present invention relates to rocket motors and in particular to coatings for improving the mechanical strength of the propellants used in the motors.

Although the present invention can be used beneficially with a number of propellant compositions, it has been found to be of particular value when used with the so-called XLDB and CMDB propellants defined in the foregoing Abstract. Although XLDB propellant is used extensively and used to advantage in many rocket motors, such as the Trident C-4, its composition nevertheless is known to involve a trade off in that its increased energy content is obtained by some sacrifice in its mechanical strength. Increasing its strength while preserving its energy level is regarded as a matter of significant advantage.

An XLDB propellant formulation includes finely-divided solid oxidizers, such as cyclotetramethylene tetranitramine (HMX), ammonium perchlorate (AP) and metal fuels bound together by a binder system consisting primarily of a polymeric system and a plasticizer. The polymeric system contains nitrocellulose (NC) as an energetic component, a liquid polyglycol adipate (PGA) as a non-energetic component and hexamethylene diisocyanate (HDI) as a curing agent. The plasticizer usually is nitroglycerin (NG) or other nitrate esters. The binder also contains small amounts of stabilizers such as nitrodiphenylamine and N-methyl-p-nitroaniline, or other nitroanilines and very small amounts of a cure catalyst such as triphenyl bismuth or organic tin salts.

The principle advantage of these propellants when compared with other composite propellants is its increase in specific impulse due to the increased energy provided by the nitrate ester plasticizer. However, in compositions containing large amounts of NG plastizer, propellant strengths, such as tensile and tear strengths and modulus, tend to be relatively low. The reason is that these strengths are decreased because nitrate ester or NG is added at the expense of the polymeric binder. A trade off therefore involves specific impulse and propellant strength.

An object of the present invention is, therefore, to improve the propellant strength without sacrificing the energy level provided by the propellant formulation.

More specifically, another object which will become more apparent in the ensuing description, is to provide a particular coating for the propellant which improves its tear strength without sacrificing its energy content or significantly affecting the ignition capability of the propellant.

A further object is to improve the tear strength by providing a coating for selected areas of the port surfaces of an XLDB propellant.

DETAILED DESCRIPTION OF THE DRAWINGS

The present invention is illustrated in the accompanying drawings of which:

DETAILED DESCRIPTION OF THE INVENTION

Figure 1:
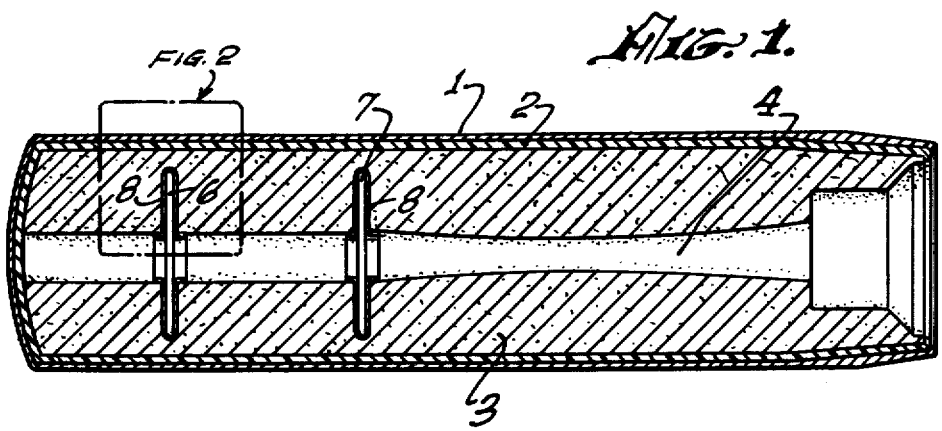
FIG. 1 is a sectional view of a typical rocket motor.

FIG. 1 shows in diagramatic form a typical rocket motor having a motor case 1, an insulation 2 and a propellant 3. The propellant is a cast structure formed of an oxidizer and a binder system including a polymer and a plasticizer. The polymer contains nitrocellulose, a liquid polyglycol adipate and hexamethylene diisocyanate as a curing agent. The plasticizer is nitroglycerin and as usual the binder also may contain small amounts of stabilizers and usually a cure catalyst. In fabricating the rocket motor, a case bond lacquer customarily is applied to and cured on the surface of the insulation prior to the casting of the propellant. Case bonding of the propellant to the insulation then occurs during the cure of the propellant.

As shown in FIG. 1 the cast propellant structure includes an axially-extending port 4 conventionally employed in rocket motors to conduct the combustion bases to a nozzle (not shown) which is mounted at the head end of the casing, this head end being the right-hand end as shown in FIG. 1. Port 4 usually is formed by the use of a core which, after the propellant is cast, is removed and the port surfaces then machined to conform with the design parameters of the rocket motor. In this regard, it is to be particularly noted that the surfaces of port 4 include a pair of radially-extending slots 6 and 7. These slots frequently are used to provide stress relief and to help in providing a required amount of thrust during a given time span. Other similar slot configurations such, for example, as the somewhat conventional star-shaped port surfaces also may be employed. Experience has demonstrated that the propellant stresses which may occur produce tears or cracks particularly along the surfaces of such machined areas as radial slots 6 and 7 or other similar structural configurations and, in particular, at their outermost edges. In addition, it is known that damaging tears can propagate from port surface areas where there are minor imperfections or blemishes due to the machining of the surfaces.

Figure 2:
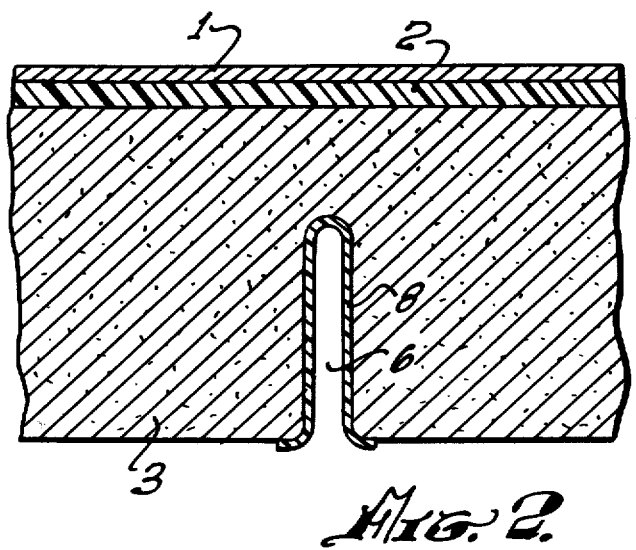
FIG. 2 is an enlarged view of the portion of FIG. 1 enclosed in its dot and dash lines.

The purpose of the present invention is to improve the tear strength of rocket motor propellants. In general, tear strength is improved by the application of a small amount of polymeric material on selected areas of the port surfaces of the motor. By way of illustration, the enlargement of FIG. 2 shows the application of a polymeric coating 8 to the port surfaces and particularly to the surfaces of slots 6 and 7 which are subject to maximum stress. Other typical sites would include surface blemishes caused by the loosening of a solid particle during the machining process.

In the manner to be described, a suitable coating is formulated by employing stoichiometric quantities of an essentially trifunctional polygylcol adipate, known as E606, and hexamethylene diisocyanate (HDI). As will be appreciated, the hydroxyl groups of the E606 react with the isocyanate groups of HDI to form urethane groups. Specifically, the formulation would include ratios of about 1 to 2 isocyanate groups to 1 hydroxyl group. An excess of isocyanate groups is more useful in applications in which the binder of the propellant uses an isocyanate to hydroxyl ratio of less than 1. In other words, in the XLDB propellant formulation, the polymer system may be provided with an isocyanate-to-hydroxyl ratio of less than 1. When the present coating is cured on the propellant's port surfaces, bonding of the propellants' unreacted hydroxyl groups can be achieved. The coating formulation also may include a cure catalyst to permit a more rapid increase in tear strength. Either an organic tin salt such as dibutyl tin diacetate in a concentration of about 5 to 100 ppm, or triphenyl bismuth in a concentration of 30–400 ppm can be used.

The material identified by the trade name as E606 previously was known as Multron R18. It is Mobay Chemical Company polyester prepared from adipic acid, diethylene glycol and a small amount of a trifunctional alcohol. It has a number average molecular weight of about 2500–3000 and an equivalent weight of about 850–950. Viscosity is moderate and in the range of 25 poises at 55° C. A product known as Rucoflex F-101-60 also can be used. This product is similar to E606 except that, apparently, it uses a different trifunctional alcohol. It is prepared and marketed by Ruco Division of Hooker Chemical Corp. Preferably, these commercially available polyesters may be initially treated to remove unreacted components since, based upon previous experience, such a treatment would further improve the tear strength.

In the tests which will be described, the formulation included stoichiometric quantities of the PGA and the HDI. Other trifunctional and difunctional isocyanates can be used. For example, Mobay Chemical Company recently has introduced a trifunctional isocyanate bearing the trade name, Desmodur N-100, which essentially is a trimer of HDI. This isocyanate is useful in the present coating procedure since cross-linking of the binder system and, consequently, the strength of the binder is increased. Appropriate difunctional isocyanates include 2, 4, 4-trimethylhexamethylene diisocyanate and 3-isocyanato-methyl-3,5,5-trimethylcyclohexyl isocyanate distributed by Hugo Stinnes Chemical Co.

It is to be recognized that the use of a coating can be extended to propellants other than the described XLDB and CMDB propellants. Thus, improvements both in surface tear strength and surface elongation should be obtainable for most any comparable type of propellant by applying to its port surfaces an uncured polymeric system which is similar to or miscible with the polymeric system of the propellant. Curing of the polymeric system of the coating on the propellant port surfaces then provides the desired cross-linked coating which is capable of cross-linking with unreacted functional groups of the propellant system. In this regard, it will be appreciated that cross-linking occurs because of the relatively high functionality of E606 which is in the range of 2.4 – 2.7. In addition to the cross-linking, chain extension, of course, occurs and a cross-linked gel is formed to impart the desired additional strength.

An important feature to be noted is that the present coating is applied and cured in place on the propellant's port surface. To apply the coating materials, a benzene solution is formed with the amount of the benzene carrier being small and in the order of about 2-50%. When large amounts are used, benzene has a tendency to extract propellant plasticizers, such as nitroglycerin. Other volatile solvents also can be employed such as tetrahydrofuran, or methylene chloride which are solvents for PGA and HDI, but which are not solvents for the solid oxidizers of the propellant. The application is achieved simply by brushing the material onto the desired surfaces following which the benzene, which is used to aid in distributing the polymeric coating over the surfaces, is evaporated in an appropriate manner, such as by passing dry air or nitrogen over the surfaces.

After application and evaporation, the coating is permitted to age a sufficient time to assure a complete reaction between hydroxyl and isocyanate groups both of the coating and propellant.

The improvement in tear strength can be noted from the following table, which compares the tear strength of control propellants coated with the present coating with other samples which, as shown, are uncoated or coated either with benzene, Multron R-18 or HDI:

IMPROVING TEAR STRENGTH OF CMDB PROPELLANT

| Condition[a] | Aging Time[b] (Days) at Temperature (° F) | Tear Strength[c] (psi) |
|---|---|---|
| Uncoated, Unaged | 0 – 77 | 36,35,35,35,37 (36) |
| Coated with Benzene | 6 – 77 | 34,37,33 (35) |
| Coated with Multron R18 | 6 – 77 | 35,35,33 (34) |
| Coated with HDI | 6 – 77 | 37,35,33 (35) |
| Coated with Multron-HDI | 6 – 77 | 37,35,36 (36) |
| Coated with Multron-HDI | 53 – 77 | 39,39,39 (39) |
| Coated with Multron-HDI | 110 – 77 | 42,40,41 (41) |
| Uncoated | 14 – 120 | 33,33,35 (34) |
| Coated with Multron-HDI | 14 – 120 | 34,35,35 (35) |
| Uncoated | 42 – 120 | 34,32,35 (34) |
| Coated with Multron-HDI | 42 – 120 | 37,37,38 (37) |

[a]Liquid added as 20% solution in benzene. Benzene removed by subjecting specimen to reduced pressure. Equivalent quantities of Multron R-18 and HDI were used in that coating.
[b]Specimens aged at 77° stored in desiccator containing molecular sieves as desiccant. Specimens aged at 120° F first dried in desiccator and then wrapped singly in aluminum foil.
[c]Mechanical properties of propellant IDB-302 (VLN) were 90 psi $\sigma_m$, 51% $\epsilon_m$ and 605 psi E.

In the above table, the control propellant was in the form of casting having the mechanical properties of 90 psi$\sigma_m$, 51%$\epsilon_m$ and 605 psi E(21-day cure at 120° F.).

The test results show that all coated specimens have similar tear strengths averaging about 34–36 psi when tested after drying, or in other words after standing six days at 77° F. Improvements in tear strength occur when the Multron R-18-HDI coated specimens are allowed to stand at 77° F for the longer period of time such as the 53 – 110 days shown in the table. Progressively, the tear strength increased from 36 at 7 days to 39 and then to 41 psi. The improvement in the tear strength is attributed to the increased reaction that occurs between the Multron R-18 and HDI with increased time.

Other specimens coated with Multron R-18 were aged at 120° F in an attempt to hasten the degree of reaction. These specimens were wrapped singly in aluminum foil and were tested in triplicate. Results indicate that the tear strength slightly improved with time in comparison to uncoated controls. The decrease in tear strength of the controls probably was due to a loss of nitroglycerin upon heating at 120° F.

It further is to be recognized that the improvement in tear strength with time is not due merely to an increase in propellant tensile strength on aging. This fact is clear from the following table which shows that upon aging of a similar propellant containing the same amount of catalyst, the propellant essentially was cured in one week at 120° F:

| Cure conditions time (days) at temperature (° F) | $\sigma_m$ (psi) | $\epsilon_m$ (%) | E (psi) |
|---|---|---|---|
| 7 at 120 | 94 | 45 | 503 |
| 21 at 120 | 94 | 45 | 517 |
| 21 at 120 + 14 at 105 | 98 | 44 | 536 |

In coating the port surfaces of a rocket motor, it is preferred to coat only those surfaces subject to the greatest stresses, or to coat particular areas where surface blemishes are apparent, and tears or cracks frequently may initiate. In the FIG. 2 enlargement, the coated surfaces are restricted to the surfaces of the radial slots, and are of particular importance along the outer surfaces of these slots where the maximum stresses occur. One possible difficulty may be experienced if an excessive amount of the coating is applied to all of the port surfaces. In particular, a high concentration of the inert polymeric material on the port surfaces may result in ignition difficulties. Such difficulties can be overcome by using a longer burning ignitor, or by using some nitrocellulose in the coating material. However, because of possible ignition problems, application may be restricted to selected port surfaces. Also, the material is applied in such quantity as to produce a thin (<1 mil), rubbery film on these particular surfaces.

Obviously many modifications and variations of the present invention are possible in the light of the above teachings. It is therefore to be understood that within the scope of the appended claims the invention may be practiced otherwise than as specifically described.

I claim:

1. A method of increasing the tear strength of the propellant of a rocket motor in which the propellant is a molded structure formed with an axial gas-conducting port, said method including the steps of:
    dissolving in a volatile solvent stoichiometric quantities of a polyglycol adipate and an isocyanate with said quantities being adjusted to provide a ratio of 1-2 isocyanate groups to one hydroxyl group,
    applying said solution as a coating on selected areas of said port surfaces,
    evaporating said solvent, and
    aging said coating sufficiently to achieve an essentially complete reaction between said hydroxyl and isocyanate groups for forming on said selected surface areas a tear-inhibiting polymeric gel, said polyglycol adipate having a relatively high functionality for assuring a cross-linked protective coating.

2. The method of claim 1 wherein said polyglycol adipate is trifunctional and said isocyanate is selected from a group of difunctional and trifunctional isocyanates consisting of hexamethylene isocyanate, a hexamethylene isocyanate Trimer, 2, 4, 4-trimethylhexamethylene diisocyanate and 3-isocyanatomethyl-3, 5, 5-trimethylcyclohexyl isocyanate.

3. The method of claim 2 wherein said molded propellant structure is further provided with radially extending slots and wherein said selected areas of solution application consist essentially of said slot surfaces.

4. The method of claim 1 wherein said propellant includes a polymer system formed by a reaction of hydroxyl and isocyanate groups.

5. The method of claim 4 wherein the ratio of isocyanate to hydroxyl groups of said propellant binder system is less than one whereby excess isocyanate groups of said coating can reactively cross-link with said propellant hydroxyl groups.

6. A polymeric coating for use on the port surfaces of a rocket motor propellant having an axially-extending gas-conducting port, said propellant including an oxidizer material and a binder formed of a plasticizer and a polymer system, the latter being formed by a reaction product of polyglycol adipate and a diisocyanate, said coating comprising:
    a cross-linked polymeric gel formed by reacting an essentially trifunctional polyglycol adipate with a stoichiometric quantity of an isocyanate selected from a group of difunctional and trifunctional isocyanates consisting of hexamethylene isocyanate trimer, 2, 4, 4-trimethylhexamethylene diisocyanate and 3-isocyanatomethyl-3, 5, 5-trimethyleyclohexyl isocyanate.

7. A rocket motor comprising:
    a casing,
    a molded propellant structure contained in said casing,
    said structure being formed of an ignitable propellant material provided with an axially-extending gas-conducting port and said propellant material including an oxidizer material and a binder formed by a plasticizer material and a polymer system, the latter being a reaction product of a polyglycol adipate and a diisocyanate, and
    a cross-linked polymeric gel coating formed in situ on at least selected areas of said port surface,
    said coating being formed by reacting a trifunctional polyglycol adipate with a stoichiometric quantity of an isocyanate selected from a group of difunctional and trifunctional isocyanates consisting of a hexamethylene isocyanate trimer, 2, 4, 4-trimethylhexamethylene diisocyanate and 3-isocyanatomethyl-3, 5, 5-trimethylcyclohexyl isocyanate.

8. The rocket motor of claim 7 wherein said polymer system of said propellant has excess hydroxyl groups,
    said gel being formed by reacting stoichiometric quantities having a ratio of isocyanate to hydroxyl groups of about 1-2 whereby said isocyanate groups can reactively cross-link with said excess hydroxyl groups of the propellant.

9. The rocket motor of claim 7 wherein said coating is selectively restricted to those portions of said port surface subjected to greater than average stresses and to other portions weakened by the presence of surface blemishes.

10. The rocket motor of claim 7 wherein said plasticizer of said propellant is a nitrate ester and the tear strength of the propellant is low due to the relative quantities of the nitrate ester and polymer in said propellant binder.

11. The rocket motor of claim 9 wherein said axial port is provided with a plurality of radially-extending slots, said selected portions including surfaces of said slots.

* * * * *